(12) United States Patent
Yamane et al.

(10) Patent No.: US 7,771,770 B2
(45) Date of Patent: Aug. 10, 2010

(54) PACKAGED COFFEE DRINK

(75) Inventors: Hidefumi Yamane, Sumida-ku (JP);
Yoshikazu Ogura, Sumida-ku (JP);
Yoko Sugiura, Sumida-ku (JP); Tatsuya Kusaura, Sumida-ku (JP)

(73) Assignee: Kao Corporation, Tokyo (JP)

( * ) Notice: Subject to any disclaimer, the term of this patent is extended or adjusted under 35 U.S.C. 154(b) by 280 days.

(21) Appl. No.: 11/814,170

(22) PCT Filed: Jan. 30, 2006

(86) PCT No.: PCT/JP2006/301438

§ 371 (c)(1),
(2), (4) Date: Jul. 18, 2007

(87) PCT Pub. No.: WO2006/080490

PCT Pub. Date: Aug. 3, 2006

(65) Prior Publication Data

US 2009/0011095 A1    Jan. 8, 2009

(30) Foreign Application Priority Data

Jan. 31, 2005    (JP) .............................. 2005-023782

(51) Int. Cl.
*A23F 5/24* (2006.01)
(52) U.S. Cl. ...................... 426/594; 426/595; 426/115; 426/250
(58) Field of Classification Search ................. 426/115, 426/250, 594, 595
See application file for complete search history.

(56) References Cited

U.S. PATENT DOCUMENTS 6,703,056 B2 * 3/2004 Mehansho et al. ............ 426/74
2002/0051810 A1    5/2002 Suzuki et al.

FOREIGN PATENT DOCUMENTS

| JP | 4-36148 | 2/1992 |
| JP | 4-360647 | 12/1992 |
| JP | 6-205641 | 7/1994 |
| JP | 7-184546 | 7/1995 |

(Continued)

OTHER PUBLICATIONS

Machine Translation of JP2003-204756.*

(Continued)

*Primary Examiner*—Keith D Hendricks
*Assistant Examiner*—Andrew Krause
(74) *Attorney, Agent, or Firm*—Oblon, Spivak, McClelland, Maier & Neustadt, L.L.P.

(57) ABSTRACT

A packaged coffee drink containing chlorogenic acid in high concentration and having excellent flavor and suppressed precipitation when stored for a prolonged time is provided. The heat-sterilized packaged coffee drink contains (A) mono-caffeoylquinic acid, (B) ferulaquinic acid and (C) dicaffeoylquinic acid, the drink containing (i) a total of from 0.19 to 4% by mass of the components (A), (B) and (C) in a dissolved state, (ii) 80% by mass or more of water and (iii) from 0.005 to 0.028% by mass of a brown colorant in terms of edible yellow dye No. 4, wherein (iv) the mass ratio of magnesium/sodium is from 0.04 to 1, and (v) the mass ratio of quinic acid/brown colorant is from 0.5 to 30.

11 Claims, 2 Drawing Sheets

FOREIGN PATENT DOCUMENTS

| | | |
|---|---|---|
| JP | 10-48819 | 2/1998 |
| JP | 11 225673 | 8/1999 |
| JP | 2002-53464 | 2/2002 |
| JP | 2002-145765 | 5/2002 |
| JP | 2003 204755 | 7/2003 |
| JP | 2003 204756 | 7/2003 |
| JP | 2003-261444 | 9/2003 |
| JP | 2003 284496 | 10/2003 |

OTHER PUBLICATIONS

Organic Dyestuffs Corporation, 'Foods, Drugs, and Cosmetics Dyes', Accessed May 13, 2009.*
Coffee Chemistry: Coffee Acidity, Accessed Dec. 15, 2009.*
USDA Nutrient Database Entry, Accessed Dec. 15, 2009.*
U.S. Appl. No. 11/816,982, filed Aug. 23, 2007, Yamane, et al.

* cited by examiner

PACKAGED COFFEE DRINK

FIELD OF THE INVENTION

The present invention relates to a packaged coffee drink containing a high concentration of physiologically useful chlorogenic acids in a dissolved state, which is excellent in flavor and allows for suppressed precipitation when stored for a prolonged period.

BACKGROUND OF THE INVENTION

Coffee drinks are highly favored universally, and the so-called instant coffee drinks, which can be prepared from roasted and grounded beans or dried and granulated coffee extract, are widely consumed around the world. In Japan, meanwhile, packaged coffee drinks produced industrially tend to be favored as daily drinks, due to its unique culture. These drinks are made easy to drink before they are on the market, so that their flavor can continue to be significant.

Coffee drinks have such a long dietary history, and many researches have been made to ingredients contained in coffee, such as caffeine and chlorogenic acids. In particular chlorogenic acids were reported to have action of improving unidentified complaint syndrome such as total malaise and fatigue and easy fatigue caused by antihypertensive action or autonomic imbalance and improving function of vascular endothelial (e.g., Patent Documents 1 to 3).

Turning to commercially sold packaged coffee drinks, there are plenty of the brands thereof, ranging from weak coffee to rich coffee, including a black coffee type and a blended type containing sugar and milk. However, those products contain a relatively small amount of chlorogenic acid. Specifically, those products contain no more than 0.05 to 0.1 by mass of chlorogenic acid.

Most of the packaged coffee drinks recently on the market in Japan have a volume ranging from 190 to 300 g, and those having a volume of 190 g, among them, are increasingly in demand. Accordingly, drinks are required to contain chlorogenic acids in high concentrations, in order to include a sufficient amount of chlorogenic acids for significantly exhibiting a physiological effect thereof with a limited package volume.

Many methods of improving storage stability of packaged coffee drinks have been proposed so far. Examples thereof include a method producing coffee extract in which low molecular weight components such as formic acid, acetic acid and propionic acid are removed by adsorption by bringing into contact with a medium or weak basic anion exchange resin and a method in which a turbid substance in the form of fine particles is removed by bringing into contact with silica gel. However, both methods not only require additional equipment for production but also have a problem of apparent decrease in necessary flavor level after storing for a long period at high temperatures (e.g. Patent Documents 4, 5).

On the other hand, although there are a method in which a cellulose viscous substance is added, a treatment employing a mannan splitting enzyme and a method of removing precipitated components by adding acid, it turns out that such enzyme and acid treatments cause severely sour taste, thereby leading their natural taste to deteriorate (e.g. Patent Documents 6 to 8).

[Patent Document 1] JP-A-2002-53464
[Patent Document 2] JP-A-2002-145765
[Patent Document 3] JP-A-2003-261444
[Patent Document 4] JP-A-04-36148
[Patent Document 5] JP-A-04-360647
[Patent Document 6] JP-A-06-205641
[Patent Document 7] JP-A-07-184546
[Patent Document 8] JP-A-10-48819

DISCLOSURE OF THE INVENTION

The present invention provides a heat-sterilized packaged coffee drink containing (A) monocaffeoylquinic acid, (B) ferulaquinic acid and (C) dicaffeoylquinic acid, the drink containing
 (i) a total of from 0.19 to 4% by mass of the components (A), (B) and (C) in a dissolved state,
 (ii) 80% by mass or more of water and
 (iii) from 0.005 to 0.028% by mass of a brown colorant in terms of edible yellow dye No. 4, wherein
 (iv) the mass ratio of magnesium/sodium is from 0.04 to 1, and
 (v) the mass ratio of quinic acid/brown colorant is from 0.5 to 30.

The present invention also provides a method of suppressing precipitation of a packaged coffee drink containing a total of 0.19 to 4% by mass of (A) monocaffeoylquinic acid, (B) ferulaquinic acid and (C) dicaffeoylquinic acid in a dissolved state, wherein a brown colorant is 0.005 to 0.028% by mass in terms of edible yellow dye No. 4, the mass ratio of magnesium/sodium is 0.04 to 1, and the mass ratio of quinic acid/brown colorant is 0.5 to 30.

MODE FOR CARRYING OUT THE INVENTION

As described above, the chlorogenic acids content in a drink needs to be high, in order to include chlorogenic acids in an amount sufficient for exhibiting a satisfactory physiological effect in a package of a limited volume. However, it has been found that if a strong coffee extract is simply used, and chlorogenic acids serving as a physiologically active is used in a concentration higher than usual, it has a problem that the rate of generation of precipitate in long term storage is remarkably increased.

On the other hand, any conventional method for stabilizing coffee drinks has a problem that the taste of coffee is destroyed.

Conversely, if the chlorogenic acids concentration is increased only by using a green coffee bean extract (non-roast plant extract) having high chlorogenic acids content without specifically using a strong extract, another problem arises in that the resulting product is not satisfactory in terms of taste preference.

Accordingly the present invention provides a packaged coffee drink containing chlorogenic acids in high concentration and having favorable flavor and suppressed precipitation when stored for a prolonged time.

In such a situation, the present inventors have studied the relation between the amount of each component in a coffee extract and the amount of generation of precipitate which is an index of the storage stability using an approach of observing individual coffee constituent components. As a result, it has been found that even for packaged coffee drinks having extremely high chlorogenic acid concentration, tasty packaged coffee drinks having good long term storage stability can be obtained by controlling the amount of a specific brown colorant, the quinic acid/brown colorant ratio and the magnesium/sodium ratio.

The packaged coffee drink of the present invention contains chlorogenic acids having various physiological actions in high concentration, retains original favorable flavor of coffee, and has good stability with little precipitate generated even in long term storage.

Figure 1:
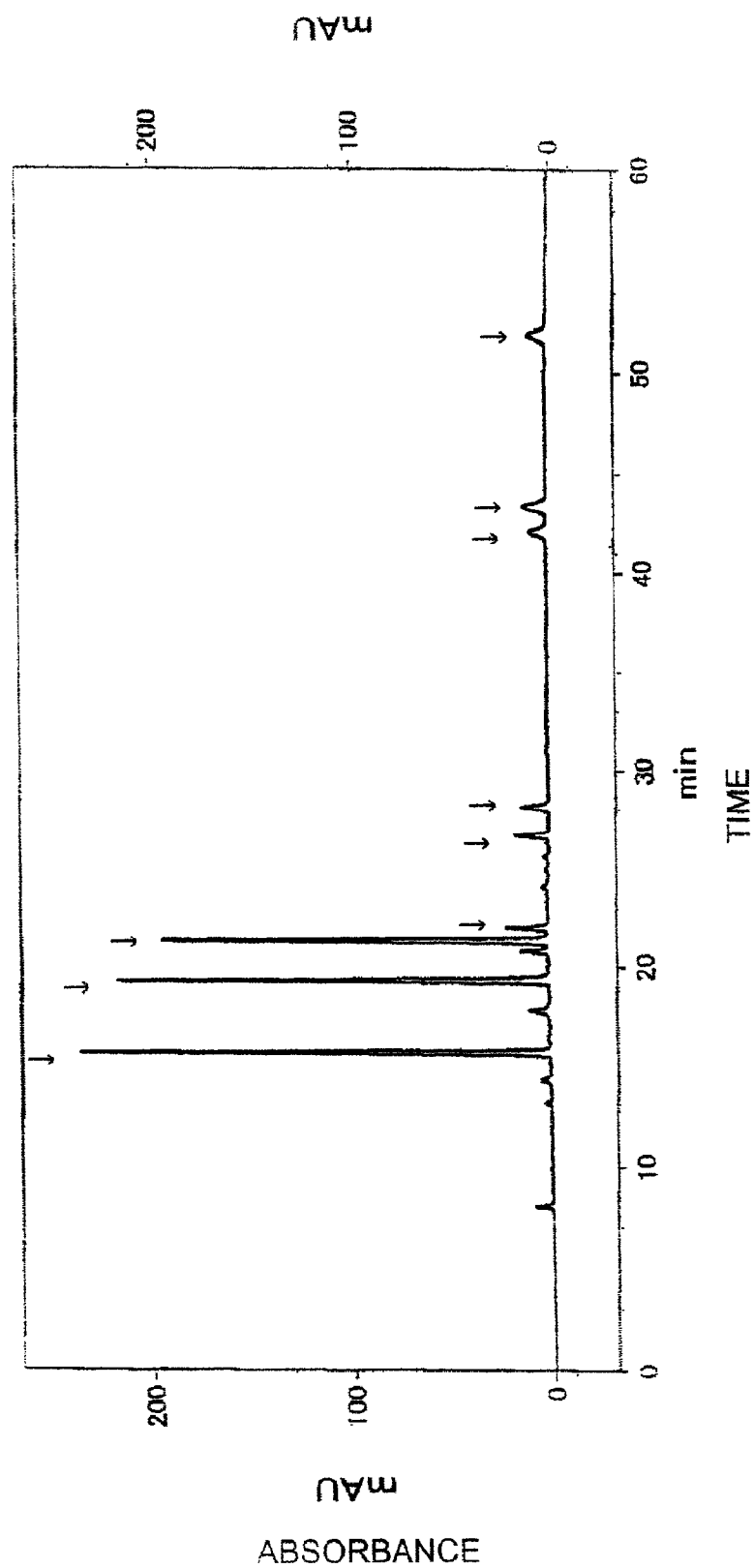
FIG. 1 is a view illustrating an HPLC chart of chlorogenic acids (detection wavelength: 325 nm)

While the packaged coffee drink of the present invention contains many types of chlorogenic acids in a dissolved state, the packaged coffee drink contains the following three types as chlorogenic acids: (A) a monocaffeoylquinic acid component, (B) a ferulaquinic acid component and (C) a dicaffeoylquinic acid component (corresponding to peaks indicated by arrows in FIG. 1). The component (A) is at least one member selected from 3-caffeoylquinic acid, 4-caffeoylquinic acid and 5-caffeoylquinic acid. The component (B) is at least one member selected from 3-ferulaquinic acid, 4-ferulaquinic acid and 5-ferulaquinic acid. The component (C) is at least one member selected from 3,4-dicaffeoylquinic acid, 3,5-dicaffeoylquinic acid and 4,5-dicaffeoylquinic acid.

The chlorogenic acid in a dissolved state refers to chlorogenic acid that passes through a membrane filter (GL Chromatodisk 25A available from GL Sciences Inc., pore size: 0.45 μm) when filtering a coffee drink through the filter.

In the present invention, the total content of components (A), (B) and (C) is from 0.19% by mass to 4% by mass for exhibiting physiological effects and stability. To exhibit a significant physiological effect, the total content is preferably 0.19% by mass or more. When the total content is more than 4% by mass, physical stability of chlorogenic acids in the packaged drink is lost. The total content of components (A), (B) and (C) is preferably from 0.2 to 3.9% by mass, more preferably from 0.25 to 3.5% by mass, far more preferably from 0.26 to 3% by mass, and even more preferably from 0.3 to 2.5% by mass in view of physiological effects.

To further improve the physical stability, the total content of components (A), (B) and (C) is preferably 1% by mass or less, more preferably 0.5% by mass or less.

The mass ratio of magnesium to sodium in the present invention is magnesium/sodium=from 0.04 to 1, more preferably from 0.08 to 0.7, far more preferably from 0.12 to 0.6, even more preferably from 0.17 to 0.5. When the magnesium/sodium mass ratio is less than 0.04, the coffee is saltier and tastes poor. When the magnesium/sodium mass ratio is more than 1, the storage stability is reduced The magnesium/sodium ratio in the coffee drink can be adjusted to the above ratio by adding a sodium salt such as sodium ascorbate, sodium hydroxide or sodium hydrogen carbonate or a magnesium salt such as magnesium chloride, magnesium carbonate or magnesium glutamate.

While the packaged coffee drink of the present invention contains 80% by mass or more, precisely from 80 to 99.8% by mass of water, it contains preferably from 85 to 99% by mass of water.

The brown colorant in the packaged coffee drink of the present invention means a brown colorant present in the coffee drink in a dissolved state, which is a fraction that has a molecular weight of 250,000 or more in the measurement method described below. The fraction corresponds to peaks with a retention time shorter than 14 minutes.

Although brown colorants are known to be characteristics of roasted coffee, there are little data of their properties and structures, and they are nearly unknown. The brown colorant in a dissolved state refers to a brown colorant that passes through a membrane filter (DISMIC-13CP, cellulose acetate film available from Advantec Toyo Kaisha, Ltd., pore size: 0.45 μm) when filtering a coffee drink through the filter.

The content of the brown colorant (in terms of edible yellow dye No. 4, also Tartrazine) according to the present invention is from 0.005 to 0.0280 by mass in terms of the taste. When the content is less than 0.005% by mass, a good bitter taste unique to coffee drinks is difficult to achieve. When the content is more than 0.028% by mass, precipitate is easily generated at an early stage of storage in the case of a packaged coffee drink having a chlorogenic acid concentration of 0.19% by mass or more.

The mass ratio of the quinic acid to the brown colorant in the present invention is preferably quinic acid/brown colorant (in terms of edible yellow dye No. 4)=0.5 to 30, more preferably 2 to 30, yet more preferably 4 to 30, yet more preferably 6 to 30, yet more preferably 6 to 28, yet more preferably 6 to 26, yet more preferably 6 to 24, and yet more preferably 7 to 16. When the mass ratio is more than 30, the initial taste is not good due to quinic acid and a specific rich flavor derived from brown colorants is lost after storing. When the mass ratio is less than 0.5, it is not favorable because bitterness is likely to be remained in the mouth.

The mass ratio of the quinic acid to the brown colorant can be adjusted, for example, by separately adding quinic acid or removing quinic acid using an adsorbent. Alternatively, the mass ratio may be adjusted by use of a preparation having a highly brownish color tone compared with quinic acid, which can be obtained by treating coffee extract with an absorbent.

While quinic acids include salts of quinic acids, acyl components such as components (A), (B) and (C) are not included.

The mass ratio of (D) 3-caffeoylquinic acid to (E) 4-caffeoylquinic acid in the present invention is preferably E/D=0.6 to 1.2, more preferably E/D=0.65 to 1.15, even more preferably E/D=0.7 to 1.1, far more preferably E/D=0.8 to 1 in terms of the taste of the coffee drink. The mass ratio of (D) 3-caffeoylquinic acid to (F) 5-caffeoylquinic acid in the present invention is preferably F/D=0.6 to 3, more preferably F/D=0.7 to 2, even more preferably F/D=0.75 to 1.8, far more preferably F/D=0.8 to 1.5 in terms of the taste of the coffee drink.

In the heat sterilization in the present invention, the F value (250° F. (121° C.) see Bokin Bobai Handbook (Antibacterial Antifungal Handbook) edited by The Society for Antibacterial and Antifungal Agents, Japan, published by GIHODO SHUPPAN Co., Ltd., p. 642) in the sterilization is preferably 20 minutes, more preferably 30 minutes or more, far more preferably 40 minutes or greater for improving long term storage stability from a microbiological viewpoint.

The packaged coffee drink of the present invention can be prepared by extracting from roasted coffee beans and/or granulated products thereof with water or hot water, sterilizing and then packing, or packing and then sterilizing according to a conventional method.

In addition to the above usual method, the chlorogenic acid content can be adjusted by mixing non-roast or low-roast extract of a plant containing chlorogenic acid to the roasted coffee bean extract. Herein, examples of plants containing chlorogenic acid used for preparing the non-roast or low-roast extract include coffee beans, hawthorns, grapes, *Cnidium officinale, Angelica acutiloba, Coptis japonica*, turmeric, *Ferula assa-foetida*, sweet potatoes and mulukhiyyas. Coffee beans are preferred from the viewpoint of easiness in controlling the taste of the coffee drink. Accordingly, the composition of chlorogenic acids can also be adjusted by mixing green coffee bean extract or low-roast coffee bean extract to usual roasted coffee extract. Also, coffee extract can be prepared using coffee beans of a single roast degree or different roast degrees.

While coffee beans used in the present invention are not particularly limited, examples thereof include Brazilian coffee, Columbian coffee, Tanzanian coffee and Moca coffee. Examples of types of beans include *Coffea arabica* L. and robusta. One type of coffee beans may be used or plural types may be mixed. Coffee beans may be roasted by a usual method and the degree of roast may be appropriately adjusted according to the desired taste. Specifically, heavily roasted coffee tastes bitter while lightly roasted coffee tastes sour. The upper limit of the L value of roasted beans is preferably 31 or less, more preferably 28 or less, further preferably 25 or less in terms of the taste. The lower limit of the L value of roasted beans is preferably 16 or more, more preferably 18 or more, further preferably 20 or greater, far more preferably 22 or greater because the amount of remaining chlorogenic acid contained in roasted beans is high.

Preferably, green coffee beans are crushed as appropriate and extraction is performed using ethanol, an aqueous ethanol solution or methanol at room temperature to 100° to prepare green coffee bean extract. Examples of commercially available green coffee bean extract include Flavor Holder RC-30R.

The coffee drinks defined in the present invention include all of the coffee-containing soft drinks, coffee drinks and coffee defined in Fair Competition Rules concerning Labeling of Coffee Drinks.

The single strength drink defined in the present invention refers to a drink drinkable as it is without diluting after opening. Concentrated coffee that is supposed to be drunk after diluting is apparently excluded from the scope of the present invention.

Sugar such as sucrose, glucose, fructose, xylose, fructose glucose liquid or sugar alcohol, milk constituents, antioxidants, pH adjusters, emulsifiers and flavoring ingredients may be added to the coffee drink of the present invention Examples of milk constituents include raw milk, cow milk, whole milk powder, skim milk powder, fresh cream, concentrated milk, skim milk, partially skimmed milk and evaporated milk.

The coffee drink of the present invention has a pH of preferably 4 to 7, more preferably 5 to 7 for the stability of the drink.

Examples of antioxidants include ascorbic acid, salts thereof, erythorbic acid and salts thereof. Of these, ascorbic acid and salts thereof are particularly preferred.

Preferred examples of emulsifiers include sucrose fatty acid ester, glycerol fatty acid ester, fine crystalline cellulose, lecithin, sorbitan fatty acid ester and polyglycerol fatty acid ester.

Packages used in the present invention include PET bottles, cans (aluminum, steel), paper, retort pouches and glass bottles.

Sterilization in the present invention is performed under sterilized conditions prescribed in the Food Sanitation Law when the content can be heat-sterilized after packaging in a package as in the case of metal can For PET bottles and paper packages that cannot be retort-sterilized, a method is employed in which sterilization is previously performed under sterilization conditions similar to those prescribed in the Food Sanitation Law, for example, by a plate type heat exchanger at a high temperature for a short time, and then the drink is cooled to a given temperature and packed in the package. Also, procedures are applicable in which the pH of the drink is returned to neutral under aseptic conditions after heat-sterilizing under aseptic conditions or the pH of the drink is returned to acidic under aseptic conditions after heat-sterilizing under neutral conditions.

EXAMPLES

Examples 1 to 7 and Comparative Examples 1 to 5

1. Method of Preparing Coffee Extract

Two types of roasted coffee beans (*arabica* species) were each grounded in High Cut Coffee Mill (made by KALITA Co., Ltd., gauge: between 3 and 4) and sieved through a stainless steel sieve (opening: 355 μm), and grounded beans remained on the sieve were subjected to extraction.

Extraction was performed with hot water at 95° C. using a stainless steel drip extractor to give an extract. After cooling to 20° C., the extract was centrifuged (8000 rpm, 30 minutes 20° C.) and precipitated solids were removed. The quinic acid content and the brown colorant content (in terms of edible yellow dye No. 4) of the coffee extract A are each 0.2% by mass and 0.0166% by mass. The quinic acid content and the brown colorant content (in terms of edible yellow dye No. 4) of the coffee extract 3 are each 0.4% by mass and 0.0287% by mass. Hydrogen peroxide was added to the coffee extract A so that the concentration was 2% and the mixture was stirred at room temperature for not less than 72 hours. The extract was subjected to catalase treatment and hydrogen peroxide was removed. The quinic acid content and the brown colorant content (in terms of edible yellow dye No. 4) of the resulting coffee extract C were each 0.17% by mass and 0.005% by mass.

2. Method of Preparing Coffee Drink

The extracts were mixed as shown in Table 1, and after adding an aqueous sodium bicarbonate solution and heating to a liquid temperature of 87° C., the mixture was packed in the package shown in Table 1 and heat-sterilized to prepare a packaged drink.

3. Analysis of Chlorogenic Acid

The method of analyzing chlorogenic acid in the coffee drink composition is as follows HPLC was used as the analyzer. The model of structural units of the analyzer is as follows.

UV-VIS detector: L-2420 (Hitachi High-Technologies Corporation), column oven: L-2300 (Hitachi High-Technologies Corporation), pump: L-2130 (Hitachi High-Technologies Corporation), autosampler: L-2200 (Hitachi High-Technologies Corporation), column: Inertsil ODS-2, inner diameter 4.6 mm×length 250 mm, particle size 5 μm (GL Sciences Inc.)

Analysis conditions are as follows.

Sample injection amount: 10 μL, flow rate: 1.0 mL/min, UV-VIS detector settings: wavelength: 325 nm, column oven set temperature: 35° C., eluent A: 0.05 M acetic acid, 0.1 mM 1-hydroxyethane-1,1-diphosphonic acid, 3 (V/V) % acetonitrile solution, eluent B: 0.05 M acetic acid, 0.1 mM 1-hydroxyethane-1,1-diphosphonic acid, 97 (V/V) % acetonitrile solution

| Concentration gradient conditions | | |
|---|---|---|
| time | eluent A | eluent B |
| 0 minute | 100% | 0% |
| 20 minutes | 87% | 13% |
| 25 minutes | 87% | 13% |
| 27 minutes | 85% | 15% |
| 45 minutes | 85% | 15% |
| 55 minutes | 80% | 20% |
| 50 minutes | 0% | 100% |
| 70 minutes | 0% | 100% |
| 75 minutes | 100% | 0% |
| 100 minutes | 100% | 0% |

In HPLC, 1 g of sample was accurately weighed and adjusted to 10 mL with the eluent A, and the resultant was analyzed after filtering through a membrane filter (GL Chromatodisk 25A available from GL Sciences Inc., pore size: 0.45 μm).

Retention time of chlorogenic acid (unit: minute) ($A^1$) monocaffeoylquinic acid: a total of three points of 15.7, 19.2 and 21.2; ($A^2$) ferulaquinic acid: a total of three points of 21.9, 26.6 and 28.1; ($A^3$) dicaffeoylquinic acid: a total of three points of 42.1, 43.3 and 51.8 (FIG. 1; AU in the figure standing for Absorbance Unit). From area values of nine chlorogenic acids herein determined, % by mass was calculated with 5-caffeoylquinic acid as a reference material.

4. Analysis of Brown Colorant

The method of analyzing a brown colorant in the coffee drink composition is as follows. The brown colorant was analyzed by size exclusion chromatography. The model of structural units of the analyzer is as follows.

UV-VIS detector: SPD-10A (Shimadzu Corporation), differential refractometer: RID-10A (Shimadzu Corporation), column oven: CTO-10A (Shimadzu Corporation), pump: LC-10ATvp (Shimadzu Corporation), autosampler: SIL-10A (Shimadzu Corporation), system controller: SCL-10Avp (Shimadzu Corporation), guard column: TSK guard column PWXL, inner diameter 6.0 mm×length 40 mm (TOSOH CORPORATION), column: TSKgel G4000PWXL, inner diameter 7.8 mm×length 300 mm, particle size 10 μm (TOSOH CORPORATION).

Analysis conditions are as follows.

Sample injection amount: 10 μL, flow rate: 0.5 mL/min, UV-VIS detector settings: wavelength: 420 nm (AUX RANGE: 2, REC. RANGE: 1.00, response: 4, sampling cycle: 100 msec), eluent: distilled water for high performance liquid chromatography (KANTO CHEMICAL CO., INC.), column oven set temperature: 35° C.

The time from opening of the package of the drink to be measured to the injection of the sample was 15 minutes or less.

0.1 to 0.3 g of sample was accurately weighed immediately after opening the package, and the volume was adjusted to 10 mL with distilled water for high performance liquid chromatography (KANTO CHEMICAL CO., INC.). After gentle reverse stirring, the mixture was filtered using a membrane filter (DISMIC-13CP, cellulose acetate film available from Advantec Toyo Kaisha, Ltd., pore size: 0.45 μm) and the resultant was subjected to the measurement.

Figure 2:
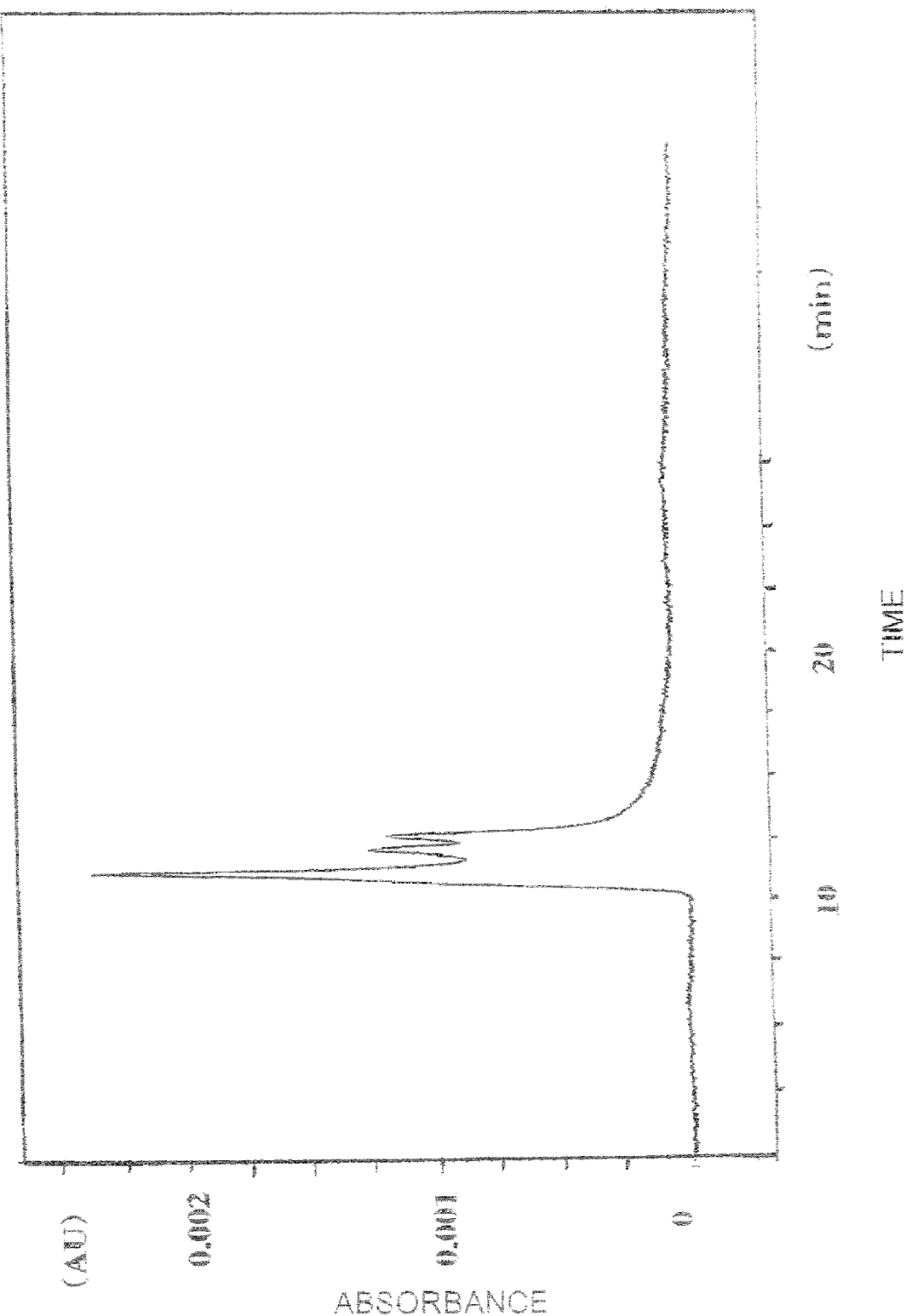
FIG. 2 is a view illustrating an HPLC chart of a brown colorant (detection wavelength: 420 nm).

The measurement was performed at 420 mm in the UV-VIS detector. From area values of eluted fractions having a molecular weight of 250,000 or more in the resulting chromatograph (FIG. 2; AU in the figure standing for Absorbance Unit, % by mass was calculated with edible yellow dye No. 4 (Tokyo Chemical Industry, Co., Ltd.) as a reference material.

The edible yellow dye No. 4 in the present invention contains 85.0% or more of 5-hydroxy-1-(4-sulfophenyl)-4-(4-sulfophenylazo-3-pyrazole carboxylic acid=trisodium salt ($C_{16}H_9N_4Na_3O_9S_2$) (molecular weight 534 37), which has been specified as a food additive, Food Yellow No. 4, Tartrazine, on Jul. 15, 1964 and specified as a food additive also by FAO/WHO, EU and the United States. (Food Safety Seminar 2, Food Additives, Aug. 20, 2001, first edition, first printing, p. 163, and Potable Six Major Laws of Food Sanity, 1996, p. 959)

The content of the reference material, edible yellow dye No. 4, was observed in accordance with Section 2 Additives in Standards for Foodstuffs and Additives (Ministry of Health and Welfare Notice No. 370, 1959).

For preparing molecular weight calibration curves, nine pullulan reference materials P-1, P-5, P-10, P-20, P-50, P-100, P-200, P-400 and P-800 (SHOWA DENKO K.K.) were used as molecular weight reference materials.

5. Analysis of Quinic Acid 5 g of an analyte was adjusted to a constant volume of 50 mL with water and measured by high performance liquid chromatography.

Equipment: LC-10AD (Shimadzu Corporation)
Detector: Ultraviolet-Visible Spectrophotometer SPD-10AVvp (Shimadzu Corporation)
Column: Shodex RSpak C-811 Φ8 mm×500 mm (SHOWA DENKO K.K.)
Column temperature: 60° C.
Mobile phase: 3 mmol/L perchloric acid
Reaction solution: a 15 mmol/L sodium dihydrogen phosphate solution containing 0.2 mmol/L bromothymol blue
Flow rate: mobile phase: 1.0 mL/min, reaction solution: 1.4 mL/min
Measurement wavelength: 445 nm
(reference: Manual of Food Sanity Inspection, Food Additives, 2003)

6. Measurement of Moisture

Moisture was measured by a normal pressure heat drying method.

The constant weight W1 (g) of a glass weighing plate containing quartz sand which is a drying auxiliary is previously measured.

A sample is put on the plate and weighed (W2) (g).

The sample is preliminary dried on a water bath and dried using a forced circulation hot air dryer.

After allowing to cool in a silica gel desiccator, the sample is weighed (W3) (g) and the moisture is calculated based on the following formula.

Moisture(g/100 g)=($W2-W3$)/($W2-W1$)×100

7. Analysis of Sodium

The sodium content was measured by atomic absorption spectrophotometry (hydrochloric acid extraction).

Specifically, 10% hydrochloric acid was added to 2 to 6 g of a sample so that a 1% hydrochloric acid solution was prepared when adjusted to a constant volume, and after adjusting to the constant volume with an ion exchange water, the absorbance was measured.

Measurement by an atomic absorption spectrophotometer was performed at a wavelength of 59.6 nm with acetylene-air flame (reference: Analytical Method for Nutritional Components under the Nutrition Labeling Standard (Eishin No. 13)).

8. Analysis of Magnesium

The magnesium content was measured by ICP emission spectromery.

5 to 6 g of a sample was collected in a beaker and incinerated in an electric oven (500° C., 5 to 6 hours). Subsequently, 20% hydrochloric acid was added thereto and the resultant was evaporated to dryness on a hot plate. 20% hydrochloric acid was further added thereto and the resultant was heated on a hot plate (100° C., 30 minutes). After filtering through filter paper (No. 5A), the resultant was adjusted to a constant volume in a measuring flask and measured with an ICP emission spectrometer (measurement wavelength: 285.213 nm) (reference: Analytical Methods for Nutrition Labeling in Japan (Eishin No. 13)).

9. Evaluation of Taste and Storage Stability

The taste and storage stability of the packaged coffee drinks shown in Table 1 were evaluated. The amount of sodium was adjusted by sodium hydrogen carbonate Evaluation of Taste
   1: good, 2: almost good, 3: moderate, 4: slightly unpleasant, 5: unpleasant Storage Stability (55° C., Stored for a Week)
   1: little precipitate, 2: some precipitate, 3: precipitate generated, not suited as commercial product

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Coffee extract A (g) |  | 349 | 321 | 303 | 293 | 170 | 117 | 283 |
| Coffee extract B (g) |  | 20 | 80 | 130 | 158 | 511 | 664 | 189 |
| Coffee extract C (g) |  | — | — | — | — | — | — | — |
| Quinic acid (g) |  | — | — | — | — | — | — | — |
| Ion exchange water (g) |  | Balance | Balance | Balance | Balance | Balance | Balance | Balance |
| Total weight (g) |  | 1000 | 1000 | 1000 | 1000 | 1000 | 1000 | 1000 |
| Heat sterilization | Temperature (° C.) | 121 | 121 | 121 | 121 | 121 | 121 | 121 |
|  | Time (minute) | 10 | 10 | 10 | 10 | 10 | 10 | 10 |
| Package |  | Metal can | Metal can | Metal can | Metal can | Metal can | Metal can | Metal can |
| Analysis result | Unit |  |  |  |  |  |  |  |
| Chlorogenic acid | (mg/100 g) | 257 | 260 | 263 | 263 | 253 | 257 | 325 |
| 4-caffeoylquinic acid/3-caffeoylquinic acid | (mass ratio) | 0.85 | 0.87 | 0.89 | 0.89 | 0.96 | 0.98 | 0.89 |
| 5-caffeoylquinic acid/3-caffeoyllquinic acid | (mass ratio) | 0.95 | 0.97 | 1.00 | 0.99 | 1.02 | 1.05 | 0.99 |
| Moisture | (g/100 g) | 98.8 | 98.5 | 98.3 | 98.0 | 96.5 | 95.8 | 97.6 |
| Na | (mg/100 g) | 31.6 | 37.6 | 42.0 | 50.3 | 66.8 | 72.6 | 63.4 |
| Mg | (mg/100 g) | 6.9 | 8.7 | 10.0 | 10.1 | 19.6 | 23.3 | 12.5 |
| Quinic acid | (g/100 g) | 0.07 | 0.09 | 0.11 | 0.12 | 0.24 | 0.29 | 0.15 |
| Brown colorant (in terms of edible yellow dye No. 4 | (mg/100 g) | 5.81 | 7.64 | 8.77 | 9.41 | 17.00 | 21.00 | 10.13 |
| Mg/Na | (mass ratio) | 0.22 | 0.23 | 0.24 | 0.20 | 0.29 | 0.32 | 0.20 |
| Quinic acid/brown colorant terms of edible yellow dye No. 4) ratio | (mass ratio) | 12.0 | 11.8 | 12.5 | 12.8 | 14.1 | 13.8 | 14.8 |
| Evaluation of taste (immediately after production) |  | 2 | 2 | 2 | 1 | 1 | 2 | 2 |
| Storage stability (55° C., 1 week) |  | 1 | 1 | 1 | 2 | 2 | 2 | 2 |

|  |  | Com. Ex. 1 | Com. Ex. 2 | Com. Ex. 3 | Com. Ex. 4 | Com. Ex. 5 |
|---|---|---|---|---|---|---|
| Coffee extract A (g) |  | — | 349 | 293 | 164 | — |
| Coffee extract B (g) |  | 950 | — | 158 | 29 | — |
| Coffee extract C (g) |  | — | — | — | — | 436 |
| Quinic acid (g) |  | — | 13.5 | — | — | — |
| Ion exchange water (g) |  | Balance | Balance | Balance | Balance | Balance |
| Total weight (g) |  | 1000 | 1000 | 1000 | 1000 | 1000 |
| Heat sterilization | Temperature (° C.) | 121 | 121 | 121 | 121 | 121 |
|  | Time (minute) | 10 | 10 | 10 | 10 | 10 |
| Package |  | Metal can | Metal can | Metal can | Metal can | Metal can |
| Analysis result | Unit |  |  |  |  |  |
| Chlorogenic acid | (mg/100 g) | 247 | 256 | 263 | 127 | 255 |
| 4-caffeoylquinic acid/3-caffeoylquinic acid | (mass ratio) | 1.00 | 0.85 | 0.89 | 0.90 | 0.85 |
| 5-caffeoylquinic acid/3-caffeoyllquinic acid | (mass ratio) | 1.05 | 0.95 | 0.99 | 1.00 | 0.95 |
| Moisture | (g/100 g) | 94.3 | 8.88 | 98.0 | 99.3 | 96.7 |
| Na | (mg/100 g) | 86.6 | 31.4 | 0.2 | 18.5 | 31.5 |
| Mg | (mg/100 g) | 32.5 | 6.8 | 14.0 | 3.7 | 6.8 |
| Quinic acid | (g/100 g) | 0.39 | 1.42 | 0.12 | 0.04 | 0.07 |
| Brown colorant (in terms of edible yellow dye No. 4 | (mg/100 g) | 28.70 | 5.60 | 9.41 | 4.10 | 2.00 |

TABLE 1-continued

| | | | | | | |
|---|---|---|---|---|---|---|
| Mg/Na | (mass ratio) | 0.38 | 0.22 | 70.0 | 0.20 | 0.21 |
| Quinic acid/brown colorant terms of edible yellow dye No. 4) ratio | (mass ratio) | 13.6 | 253.6 | 12.8 | 9.8 | 35.0 |
| Evaluation of taste (immediately after production) | | 4 | 5 | 2 | 1 | 3 |
| Storage stability (55° C., 1 week) | | 3 | 1 | 3 | 1 | 1 |

As is evident from Table 1, when adjusting the brown colorant content to 0.005 to 0.0280 by mass, the magnesium/sodium mass ratio to 0.04 to 1 and the quinic acid/brown colorant mass ratio to 0.5 to 30 in a coffee drink containing monocaffeoylquinic acid, ferulaquinic acid and dicaffeoylquinic acid, the coffee drink has good storage stability and favorable flavor.

The invention claimed is:

1. A heat-sterilized packaged coffee drink comprising (A) monocaffeoylquinic acid, (B) ferulaquinic acid and (C) dicaffeoylquinic acid, the drink comprising
   (i) a total of from 0.25 to 3% by mass of the components (A), (B) and (C) in a dissolved state,
   (ii) 80% by mass or more of water
   (iii) an amount of brown colorant to achieve an equivalent degree of coloration as compared to that achieved from a 0.005 to 0.028% by mass solution of edible yellow dye No. 4,
   (iv) magnesium ions and sodium ions in a mass ratio of magnesium ions/sodium ions of from 0.17 to 0.5, and
   v) quinic acid in a mass ratio of quinic acid/brown colorant of from 11.8 to 14.1, wherein the amount of brown colorant achieves an equivalent degree of coloration as compared to that achieved from a 0.005 to 0.028% by mass solution of edible yellow dye No. 4 as in (iii).

2. The packaged coffee drink according to claim 1, wherein component (A) comprises 3-caffeoylquinic acid, 4-caffeoylquinic acid and 5-caffeoylquinic acid and wherein the mass ratio of 4-caffeoylquinic acid/3-caffeoylquinic acid is from 0.7 to 1.1 and the mass ratio of 5-caffeoylquinic acid/3-caffeoylquinic acid is from 0.01 to 3.

3. The packaged coffee drink according to claim 1 or 2, which is a single strength drink.

4. A method of suppressing precipitation of a packaged coffee drink comprising a total of from 0.19 to 4% by mass of (A) monocaffeoylquinic acid, (B) ferulaquinic acid and (C) dicaffeoylquinic acid in a dissolved state, wherein a brown colorant is present in an amount to achieve an equivalent degree of coloration as compared to that achieved from a 0.005 to 0.028% by mass solution of edible yellow dye No. 4, comprising controlling the mass ratio of magnesium ions/sodium ions to be from 0.17 to 0.5, and the mass ratio of quinic acid/brown colorant to be from 0.5 to 30, wherein the amount of brown colorant achieves an equivalent degree of coloration as compared to that achieved from a 0.005 to 0.028% by mass solution of edible yellow dye No. 4.

5. The packaged coffee drink according to claim 1, wherein said total content of components (A), (B) and (C) is 1% by mass or less.

6. The packaged coffee drink according to claim 1, wherein said brown colorant has a molecular weight of 250,000 or more.

7. The packaged coffee drink according to claim 1, wherein component (A) comprises 3-caffeoylquinic acid and 5-caffeoylquinic acid and wherein a mass ratio of 3-caffeoylquinic acid to 5-caffeoylquinic acid is from 0.6 to 3.

8. The packaged coffee drink according to claim 1, wherein component (A) comprises 3-caffeoylquinic acid and 5-caffeoylquinic acid and wherein a mass ratio of 3-caffeoylquinic acid to 5-caffeoylquinic acid is from 0.8 to 1.5.

9. The packaged coffee drink according to claim 1, further comprising at least one additive selected from the group consisting of sugar, milk constituent, antioxidant, pH adjuster, emulsifier and flavoring.

10. The packaged coffee drink according to claim 1, wherein said coffee drink has a pH of from 4 to 7.

11. The packaged coffee drink according to claim 1, wherein said coffee drink has a pH of from 5 to 7.

* * * * *